United States Patent [19]

Di Domenico, Jr. et al.

[11] 4,165,496
[45] Aug. 21, 1979

[54] OPTICAL FIBER LIGHT TAP

[75] Inventors: Mauro Di Domenico, Jr., Bernardsville; Michael A. Karr, III, New Providence; Theodore C. Rich, Berkeley Heights, all of N.J.

[73] Assignee: Bell Telephone Laboratories, Incorporated, Murray Hill, N.J.

[21] Appl. No.: 861,288

[22] Filed: Dec. 16, 1977

[51] Int. Cl.² ............................ H01S 3/13; G02B 5/14
[52] U.S. Cl. ............................... 331/94.5 S; 350/96.15
[58] Field of Search .......................... 350/96.15, 96.16; 250/227, 552; 357/18, 19; 331/94.5 S

[56] References Cited

U.S. PATENT DOCUMENTS

| 4,021,099 | 3/1977 | Kawasaki et al. | 350/96.15 |
| 4,068,952 | 1/1978 | Erbert et al. | 350/96.16 |

OTHER PUBLICATIONS

Ikeda et al., "Multimode Optical Fibers: Steady State Mode Exciter", Applied Optics, vol. 15, No. 9, Sep. 1976, pp. 2116-2120.
Kuwahara et al., "A Semi-Transparent Mirror-Type Directional Coupler for Optical Fiber Applications", IEEE Trans Microwave Theory, Jan. 1975, pp. 179-180.
C. G. Someda, "Simple Low Loss Joints Between Single-Mode Optical Fibers", Bell System Technical Journal, vol. 52, No. 4, Apr. 1973, pp. 583-598.
D. Schicketanz, "Connectors for Multimode Fibers", Siemens Forschungs und Entwicklung Bericht, Bd 2, Nr. 4, 1973, pp. 204-205.

*Primary Examiner*—Rolf G. Hille
*Attorney, Agent, or Firm*—Michael J. Urbano

[57] ABSTRACT

An optical fiber tap is described which comprises a beamsplitter formed by positioning bevelled, parallel endfaces of two segments of optical fiber in coaxial alignment and in close proximity to each other. A suitable dielectric film, such as air, fills the gap between the endfaces. Light propagating into the tap from the first fiber segment is partially reflected and partially refracted at the bevelled endfaces. The refracted portion enters the second fiber segment and the reflected portion leaves the tap and is detected by a photodetector. By choice of the proper angle for the bevelled endfaces, the tap can be made substantially mode independent. A greater degree of mode independence can be obtained by interposing a steady-state mode exciter between the light source and the beamsplitter. The tap is particularly useful for semiconductor junction laser stabilization by the feedback arrangement described herein since the ratio of the intensity of the reflected portion to that of the refracted portion is substantially constant. A package assembly for use in the feedback arrangement is also described.

10 Claims, 6 Drawing Figures

OPTICAL FIBER LIGHT TAP

BACKGROUND OF THE INVENTION

1. Field of the Invention

The invention is directed to a light tap for use in an optical communications system, and more particularly, to a light tap designed for feedback stabilization of laser light sources.

2. Description of the Prior Art

In an optical communications system it is important that the light sources, illustratively semiconductor junction lasers, provide a constant amplitude of light into the system throughout their lifetimes. However, the light output of junction lasers varies with age, temperature, and drive current. The prior art has attempted to solve this problem by the following light monitoring and feedback arrangement wherein emission from both the front and back mirror faces of a junction laser is utilized. Light emitted from the front mirror is coupled into an optical fiber which transmits the signal through the system. Light emitted from the back mirror is converted to an electrical signal which is coupled to feedback circuitry which varies the laser drive current in response to variations in intensity of light emitted from the back mirror. There are several problems with back-mirror monitoring. First, the intensity of the back-mirror emission which is detected for feedback purposes may not be a constant proportion of the front-mirror emission which is coupled into the system. Second, the back-mirror emission is insensitive to variations in the amount of light coupled from the front mirror into the optical fiber. These variations can result from a number of sources, e.g., shifting of the lasing filament (beam wander) or of the position of the fiber with respect to the laser active region.

In a communications system it is the amplitude of light which enters the optical fiber and is subsequently propagated in the system which must be maintained substantially constant. Even assuming that a laser could be made whose light output was time invariant, aging of the package which structurally supports the source and optical fiber can cause axial and lateral displacement of the fiber with respect to the laser, thus, causing variations in the amount of light entering the fiber and in the modal distribution of the propagated light. Therefore, even with an ideal source it is important to monitor the light propagating in the fiber.

One technique for monitoring the light propagating through the fiber is to use a light tap to extract a portion of the propagating light. The extracted portion of the light can then be converted to an electrical signal which is employed in a feedback scheme for controlling the laser drive current. In order for the tap monitoring system to be effective, the extracted portion of the light should be a substantially constant proportion of the amount of light propagating through the fiber. However, as discussed above, laser beam wander and laser-to-fiber displacement as a result of aging cause time variations in the intensity and modal distribution of the propagating light. Unfortunately, prior art taps, such as those constructed with tapered fibers or those which expose the fiber core to another material of higher index of refraction, are highly mode sensitive because they sample the higher order modes propagating furthest from the longitudinal axis of the fiber. Thus, the ratio of the intensity of the extracted tap light to the intensity of the propagating light will vary with time as the modal distribution changes.

SUMMARY OF THE INVENTION

We have developed a tap which solves the problem caused by the time-varying mode distribution of light and the mode-dependent characteristics of the prior art taps. In one aspect the invention comprises a beamsplitter in combination with means to excite the steady-state mode distribution of the propagating light before it enters the beamsplitter. The steady-state mode exciter generates a modal distribution in the propagating light which is essentially independent of the input modal distribution. Thus, the extracted portion of the tap light will vary only in response to variations in the amplitude of light which enters the optical fiber, and not to its modal distribution.

In particular, the beamsplitter comprises first and second optical fibers each having a bevelled endface. The fibers are oriented in coaxial alignment and in close proximity to each other so that the endfaces are parallel to each other and form a gap. The gap may be filled with any dielectric having a different index of refraction than that of the fiber core material, e.g., air. Light propagating into the tap is partially reflected at the fiber-to-air interface at either the first or second endface or both. Light which is not reflected is refracted through the dielectric and propagates along the second fiber where it is used in the communication system. The reflected portion may then be detected by a suitable detector such as a photodiode.

In another aspect of the invention, the photodiode converts the intensity of the reflected portion to an electrical signal which is used in a feedback scheme to stabilize the output of a junction laser.

We have discovered that the ratio of the amplitude of the reflected portion to the amplitude of the refracted portion does not remain constant when the fiber is spatially displaced (i.e., misaligned) relative to the source. The ability of a beamsplitter to maintain a constant ratio is referred to as tracking. We have determined that a greater precentage of higher order modes are excited by the displacement and that tracking error is due to the fact that higher order modes have a different reflectivity than lower order modes at the fiber-to-air interface at the bevelled endfaces. Therefore, a long segment of fiber or a discrete steady-state mode exciter is interposed between the source and the tap to convert the modal distribution of the propagating light to the steady-state, i.e., a modal distribution which is essentially independent of the modal distribution of the input light. The tap accurately tracks the amplitude of laser light coupled into the fiber, has low insertion loss, is substantially mode independent, and can be easily packaged.

A further aspect of the invention relates to a package assembly for the beamsplitter and photodetector which is designed to minimize fiber movement relative to the source and to each other and is suitable for use in an optical communications system. Basically, the assembly comprises a support structure such as a silicon chip etched to form a V-groove which holds the two fibers in coaxial alignment, means for securing the fibers to the support structure such as a glass cover plate which presses the fibers into the V-groove and prevents their relative displacement, and a photodetector which is positioned over the beamsplitter at a point of maximum intensity of the reflected light.

DETAILED DESCRIPTION

Figure 1:
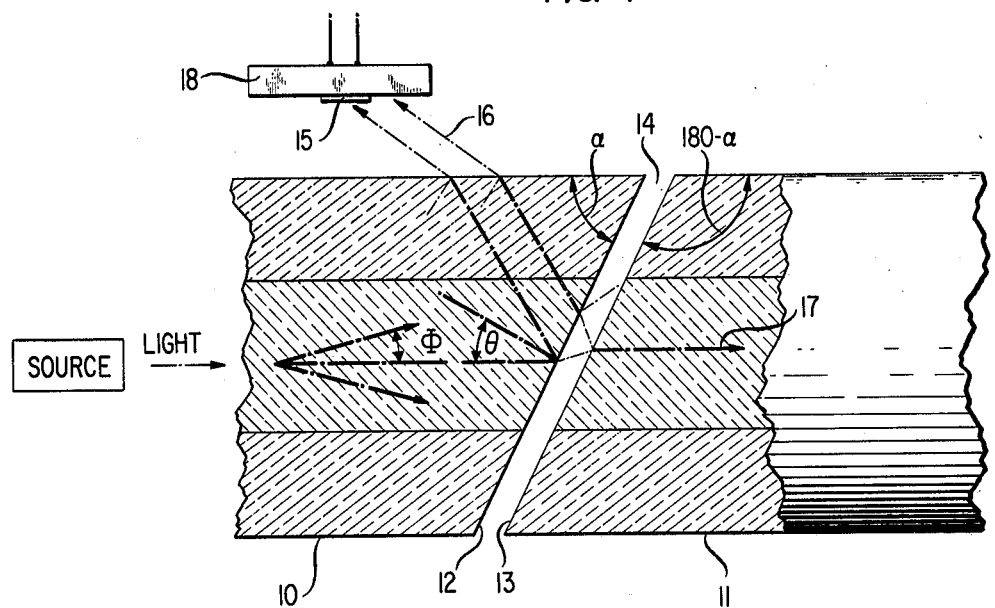
FIG. 1 shows a longitudinal cross section of the beamsplitter.

FIG. 1 is a cross-sectional representation of the beamsplitter comprising a first segment of optical fiber 10 in substantial coaxial alignment with a second segment of optical fiber 11. Optical fibers 10 and 11 are terminated at their adjacent ends with bevelled endfaces 12 and 13 which make respective angles of $\alpha$ and (180 degrees $-\alpha$) with respect to the longitudinal axis of fibers 10 and 11. The endfaces are parallel to each other and situated in close proximity to form gap 14. In one embodiment of the invention, air is used as a dielectric film in gap 14. However, other dielectrics having a higher or a lower index of refraction than the optical fiber core could be used to fill gap 14.

If the angle of incidence, $\theta$, at which rays of light propagating in fiber 10 strike endfaces 12 and 13, is less than the angle of total internal reflection, some light 17 will be refracted into fiber 11 and some light 16 will be reflected at the fiber-to-air interfaces. It is evident from the FIGURE that the angle of incidence $\theta$ is related to the ray angle $\Phi$ which in turn depends on the mode of the propagating light. Thus, light which propagates along fiber 10 in higher order modes, i.e., greater values of $\Phi$, will be reflected from endface 12 or 13 at different angles than light which propagates in the lower order modes. Header 18 is situated near the side of optical fiber 10 so that photodiode 15 receives some of the reflected rays 16.

The beamsplitter shown in FIG. 1 was constructed using a graded index multimode optical fiber of fused silica. The fiber had an outside diameter of 110 $\mu$m with a 55 $\mu$m diameter core. The numerical aperture was approximately 0.23. Bevelled endfaces 12 and 13 were formed by chem-mechanical polishing to the desired angle. The endfaces were separated from one another to form an air cap of approximately 0.75 mils. A suitable range for the spacing between the fibers is 0.5 to 1.0 mil but this spacing is not critical. The endface angle $\alpha$ was experimentally determined by plotting first transmission coefficient and tap transmission coefficients against ray angle, $\Phi$, for various endface angles within a range of $\alpha=55$ degrees to 70 degrees. Optimum tracking was achieved using an angle $\alpha$ of 65±1 degrees. At this angle, the reflectivity at the fiber-air interface is substantially constant for light rays propagating in all modes. The endface angle is a function of the difference in index of refraction between the fiber core and the gap dielectric. If a dielectric other than air is chosen, the same procedure should be used to determine a different optimum angle for the endfaces.

Figure 2:
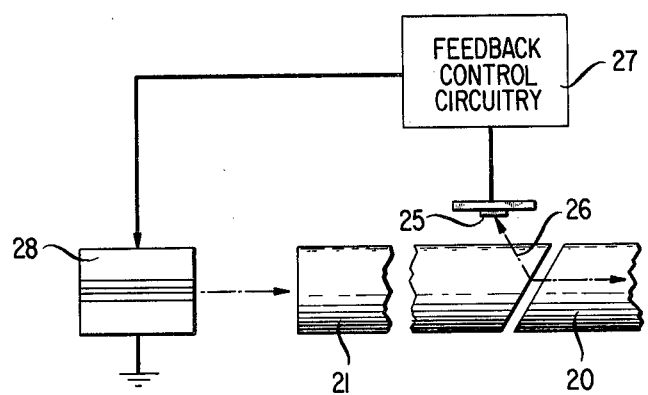
FIG. 2 illustrates a scheme for feedback stabilization of a junction laser.

In one embodiment of the invention, shown in FIG. 2, the portion of reflected light 26 impinging on photodiode 25 is converted into an electrical signal which is conducted to feedback circuitry 27 well known in the art such as that described in U.S. Pat. No. 4,009,385 issued to D. D. Sell on Feb. 22, 1977. The feedback circuitry controls the drive current of, for example, an (Al,Ga)As injection laser 28 and, consequently, the amplitude of the laser output light. In this feedback stabilization application of the invention, it is highly desirable that the portion of reflected light 26 which is received by photodiode 25 accurately tracks the amplitude of laser output light coupled into and propagating along optical fiber 20. In other words, the ratio of the average amount of light received by the photodiode to the average total light power in optical fiber 20 should be substantially constant with time.

For a coupling configuration such as shown in FIG. 2 but without feedback control circuitry 27, there are essentially three parameters which can affect the light power entering optical fiber 21: (1) changes in laser threshold (2) variations in laser drive current and (3) laser-to-fiber misalignment. Variations in laser drive current as a result of threshold or temperature changes have little effect on the modal distribution of light in optical fiber 21. Tracking error for a change in drive current is better than 0.1 dB for laser output power between 0.2 and 2 mW. On the other hand, small variations in laser-to-fiber alignment cause large variations in modal distribution. The misalignment, which can be caused either by beam wander due to change in position of the lasing filament with age or by laser-to-fiber displacement in the lateral or vertical direction, excites a greater percentage of higher order modes causing light energy to be directed away from the longitudinal axis of the fiber. The higher order modes, which have a different reflectivity at the air-to-fiber interface than lower order modes, cause a tracking error of 0.5 to 0.7 dB for a laser operating at 2 mW. This tracking error is tolerable for many applications, but unacceptable for others.

We have found that tracking problems produced by modal redistribution can be substantially alleviated by use of a particular bevel angle as discussed above. Alternatively, a greater degree of independence can be obtained by interposing a steady-state mode exciter in the optical path between the light source (laser) and the beamsplitter. The steady-state mode exciter generates a set of modes which are essentially independent of the input modal distribution. Therefore, regardless of subsequent laser-to-fiber misalignment, the modal distribution of light entering the beamsplitter will be substantially constant over time. A steady-state mode exciter has been found to reduce the overall mode dependence of the light tap, making the tracking error between zero and about 0.2 dB.

Illustratively, the steady-state mode exciter in the form of an extended length of optical fiber ($\sim$80 m) situated between the laser and the beamsplitter can reduce the tracking error to about 0.2 dB. The modes are redistributed as light propagates through the long fiber generating a steady-state mode distribution before light reaches the tap.

Figure 3:
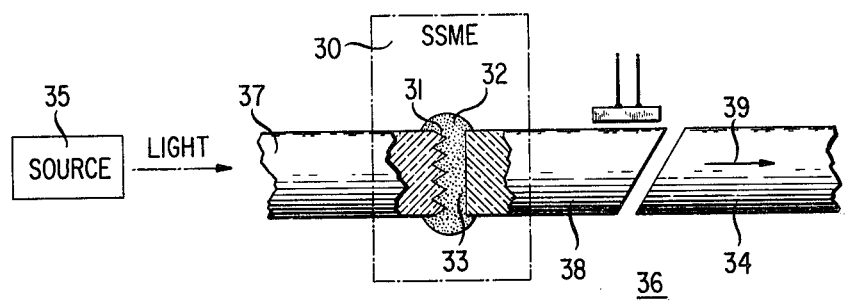
FIG. 3 illustrates a steady-state mode exciter coupled to the beamsplitter of FIG. 1.
Figure 4:
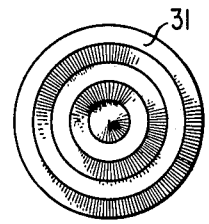
FIG. 4 shows the diffuser endface of the steady-state mode exciter illustrated in FIG. 3.

FIG. 3 shows a discrete type of steady-state mode exciter which can be coupled to the beamsplitter shown in FIG. 1 to produce the desired mode-independent effect. Steady-state mode exciter 30 is disposed in the optical path between the source 35 and beamsplitter 36. One end of optical fiber 37 is etched to form endface 31 which diffuses light propagating from optical fiber 37. Endface 33 of optical fiber 38 is planar and perpendicular to the longitudinal axis of fiber 38. Fiber 38 receives the diffused light which is propagated through adhesive 32 which joins endfaces 31 and 33. FIG. 4 shows diffuser endface 31 which is etched to form concentric rings. The procedure for fabricating this discrete steady-state mode exciter is described in an article by Ikeda, et al., in *Applied Optics,* 15, No. 9, p. 2116 (September 1976).

In addition to excellent tracking, other characteristics of beamsplitter 36 of FIG. 3 include (1) an insertion loss (output power of fiber 34 divided by input power in fiber 38) of 0.4–0.6 dB and (2) a total tap loss (output power of fiber 34 plus power received by the photodetector divided by input power in fiber 38) of less than 0.15 dB. Furthermore, the tap does not generate lossy higher order modes in refracted light 39 which is propagating through fiber 34. When source 35 is an (Al,Ga)As double heterostructure laser, polarization effects due to the plane polarized light emitted above laser threshold do not affect tracking. Light partially depolarizes as it travels down the fiber. However, if the light is not completely depolarized, the amplitude of the tap output will vary with the orientation of the tap relative to the direction of laser polarization. For feedback stabilization this effect is irrelevant since the relative mistracking remains the same despite variation in light output.

Figure 6:
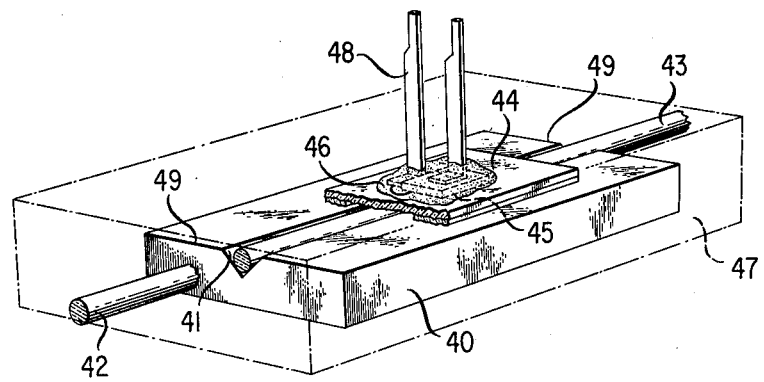

A package assembly for the beamsplitter and photodetector is shown in FIG. 6. Support structure 40 secures and maintains fibers 42 and 43 in the beamsplitter configuration shown in FIG. 1. Illustratively, support structure 40 is a silicon chip which has been preferentially etched to form a V-groove 41 of such depth that a circumferential portion of the fibers protrudes above the top surface of the chip.

The endfaces of fibers 42 and 43 are polished to the desired angle. If the fibers have a protective plastic coating, it is stripped from the end portion. The bare, bevelled ends of fibers 42 and 43 are placed in V-groove 41 with a micropositioner so that the endfaces are oriented parallel to each other and form a gap of the desired width. A drop of epoxy is applied near edges 49 to maintain the gap. Glass cover plate 44 is secured over fibers 42 and 43 to hold them in substantial coaxial alignment. Preferably, cover plate 44 is epoxied to support structure 40 around its perimeter to prevent contamination of the gap.

Now, a light source such as a laser is coupled to one of the fibers and a photodetector 45, such as a p-i-n photodiode, on lead frame 48 is positioned over the beamsplitter for maximum coupling of light reflected from the tap. Photodetector 45 is then secured to cover plate 44 with clear epoxy 46. Finally, the whole assembly is potted in opaque epoxy 47 to give it mechanical strength and to protect the photodetector from stray light.

Figure 5:
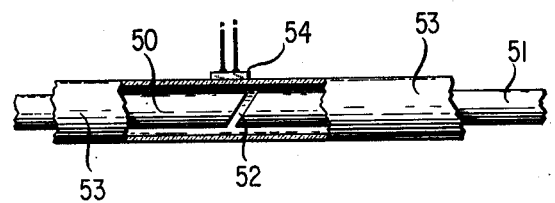
FIGS. 5 and 6 show two embodiments of a package assembly for the optical fiber tap.

Another embodiment of a package assembly is shown in FIG. 5 wherein the support structure is tubular. Illustratively, the tubular support structure comprises transparent capillary tube 53 into which the bevelled ends of fibers 50 and 51 are inserted from opposite ends. The inner diameter of capillary tube 53 is only slightly greater than the outer diameter of fibers 50 and 51 (exaggerated in the drawing) so that they fit snugly within tube 53 and are held in coaxial alignment. Fibers 50 and 51 are oriented with a micropositioner and then epoxied at the ends of tube 53 to hold them in place and maintain an air gap 52. A photodetector on lead frame 54 is positioned for maximum coupling of light reflected out of the tap and is then epoxied to the outer wall of tube 53. This assembly is likewise potted in opaque epoxy (not shown). Alternatively, the tubular support structure can be opaque as long as there is a provision for the reflected light to reach the photodetector.

It is to be understood that the above-described examples are merely illustrative of the many possible specific embodiments which can be devised to represent application of the principles of the invention. Numerous and varied arrangements can be devised with these principles by those skilled in the art without departing from the spirit and scope of the invention. In particular, the tap is suitable for data bussing applications. Other dielectric films and, thus, other endface angles could be employed to achieve mode-independent results. An anti-reflective coating could be put on one of the endfaces comprising the beamsplitter. The tap can be constructed from other types of optical fibers, such as step index or those having other numerical apertures. Junction lasers made of a variety of materials, e.g., GaAs-AlGaAsP, InGaAsP-InP-InGaAsP, AlGaAsSb-GaAsSb, etc., can be used. And, other beamsplitters and mode mixers could be employed within the principles of the invention to obtain tracking between the tap output and the amount of light from the light source (laser or light emitting diode) coupled into the downstream fiber.

What is claimed is:

1. A light tap for use in an optical communications system including a source of an optical signal and a first optical fiber to transmit said signal, said light tap comprising:
   (a) a segment of said first optical fiber having a first planar endface intersecting the longitudinal axis of said first fiber at an angle of $\alpha$;
   (b) a second optical fiber in substantially coaxial alignment with said segment and having a second planar endface intersecting the longitudinal axis of said second fiber at an angle of (180 degrees $-\alpha$), said first and second endfaces being adjacent to each other and forming a gap therebetween;
   (c) a dielectric film filling said gap which has a different refractive index than said first and second fibers; and
   (d) means disposed between said source and said first endface for exciting a steady-state mode distribution of said signal.

2. The tap of claim 1 wherein said dielectric film is air and $\alpha$ is an angle between about 55 degrees and 70 degrees.

3. The tap of claim 1 wherein said steady-state mode exciting means comprises an optical fiber of sufficient length between said source and first endface to generate at said first endface a set of modes which are independent of the input modal distribution.

4. The tap of claim 1 wherein said steady-state mode exciting means comprises a portion of said first fiber having a third endface which is etched to diffuse light and a fourth planar endface which is perpendicular to the longitudinal axis of said first fiber and is positioned in close proximity to said third endface.

5. In an optical communications system including a semiconductor junction laser as a source of an optical signal and a first optical fiber to transmit said signal, an arrangement for feedback stabilization of said laser so that the intensity of the optical signal propagating through said system remains substantially constant in time, said arrangement comprising:
  (a) a segment of said first optical fiber having a first planar endface intersecting the longitudinal axis of said first fiber at an angle of $\alpha$;
  (b) a second optical fiber in substantial coaxial alignment with said segment and having a second planar endface intersecting the longitudinal axis of said second fiber at an angle of (180 degrees $-\alpha$), said first and second endfaces being adjacent to each other and forming a gap therebetween;
  (c) a dielectric film disposed in said gap which has a difference in refractive index relative to said first and second fibers such that said optical signal is split into a portion which is refracted into said second optical fiber and another portion which is reflected in a direction transverse to the axis of said first and second fibers;
  (d) means for detecting the intensity of said reflected portion and converting said intensity into an electrical signal; and
  (e) means for controlling said laser in response to said electrical signal.

6. The arrangement of claim 5 wherein said dielectric film is air and $\alpha$ is an angle between about 55 degrees and 70 degrees.

7. The arrangement of claim 6 in combination with means to excite a steady-state mode distribution in said optical signal before said signal reaches said first endface.

8. The arrangement of claim 5 further including a package assembly for said first and second optical fibers, said package assembly comprising:
  (a) a support structure for holding said first and second fibers in coaxial alignment so that said first and second endfaces are adjacent and form a gap therebetween; and
  (b) means for securing said first and second fibers to said support structure.

9. The arrangement of claim 8 wherein said support structure comprises a silicon chip having a V-groove therein;
  said first and second fibers are disposed within said groove such that a circumferential portion extends above the top of said groove;
  said securing means comprises a transparent cover plate which presses against said fibers holding them within said groove; and
  said detecting means comprises a photodetector secured to said cover plate so as to receive light reflected from said first and second endfaces.

10. The arrangement of claim 8 wherein said support structure comprises:
  a transparent capillary tube having an inner diameter slightly greater than the outer diameter of said fibers, said first and second fibers are inserted into opposite ends of said capillary tube so that there is a gap between said first and second endfaces; and
  said detecting means is a photodetector secured to the outer wall of said capillary tube so as to receive light reflected from said first and second endfaces.

* * * * *